(12) United States Patent
Teoh

(10) Patent No.: US 7,666,314 B2
(45) Date of Patent: Feb. 23, 2010

(54) METHODS FOR THE REMOVAL OF ORGANIC NITROGEN, ORGANIC AND INORGANIC CONTAMINANTS FROM AN AQUEOUS LIQUID

(75) Inventor: Eng-Chye Teoh, Selangor Darul Ehsan (MY)

(73) Assignee: Eng Soon Teoh, Singapore (SG)

( * ) Notice: Subject to any disclaimer, the term of this patent is extended or adjusted under 35 U.S.C. 154(b) by 223 days.

(21) Appl. No.: 10/543,090

(22) PCT Filed: Jan. 15, 2004

(86) PCT No.: PCT/SG2004/000014

§ 371 (c)(1),
(2), (4) Date: Jul. 22, 2005

(87) PCT Pub. No.: WO2004/065527

PCT Pub. Date: Aug. 5, 2004

(65) Prior Publication Data

US 2006/0163171 A1    Jul. 27, 2006

(30) Foreign Application Priority Data

Jan. 24, 2003    (MY) ............................. PI20030237

(51) Int. Cl.
*C02F 1/72* (2006.01)

(52) U.S. Cl. .................... 210/749; 210/759; 210/903; 210/600

(58) Field of Classification Search ................ 210/749, 210/86, 748, 759, 903, 600
See application file for complete search history.

(56) References Cited

U.S. PATENT DOCUMENTS

| 4,066,550 | A | * | 1/1978 | Beaumont | 210/183 |
|---|---|---|---|---|---|
| 4,340,490 | A | * | 7/1982 | Junkermann et al. | 210/759 |
| 4,918,168 | A | * | 4/1990 | Stepaniuk et al. | 534/565 |
| 5,356,539 | A | * | 10/1994 | Peter et al. | 210/668 |
| 5,575,919 | A | * | 11/1996 | Santina | 210/695 |
| 5,716,528 | A | * | 2/1998 | Jasim et al. | 210/668 |
| 6,720,283 | B2 | * | 4/2004 | Ding et al. | 502/184 |
| 2003/0209498 | A1 | * | 11/2003 | Baker et al. | 210/670 |
| 2004/0104181 | A1 | * | 6/2004 | Shiota et al. | 210/762 |

FOREIGN PATENT DOCUMENTS

| JP | 05-064789 | 3/1993 |
|---|---|---|
| JP | 09-122690 | 5/1997 |
| JP | 2000-135492 | 5/2000 |
| SU | 923961 | * 4/1982 |

* cited by examiner

*Primary Examiner*—Walter D Griffin
*Assistant Examiner*—Cameron J Allen
(74) *Attorney, Agent, or Firm*—Pillsbury Winthrop Shaw Pittman, LLP

(57) ABSTRACT

The present invention relates to methods for the removal of organic nitrogen, organic and inorganic contaminants from an aqueous liquid. More particularly, the present invention related to a process for the removal of organic and inorganic contaminants such as organic nitrogen and all other organic and inorganic contaminants from wastewater and ground water by conducting a two step method which includes the step of adding nitrosonium ion generator such as nitrous acid and nitrite in acidic media to remove organic nitrogen and followed by the step of adding hydrogen peroxide and activated carbon to remove all the other organic and inorganic contaminants.

6 Claims, No Drawings

METHODS FOR THE REMOVAL OF ORGANIC NITROGEN, ORGANIC AND INORGANIC CONTAMINANTS FROM AN AQUEOUS LIQUID

CROSS-REFERENCE TO RELATED APPLICATIONS

This is the U.S. National Stage of International Patent Application No. PCT/SG2004/000014, filed Jan. 15, 2004, which, in turn, relies for priority on Malaysia Patent Application No. 20030237, filed Jan. 24, 2003, the contents of both of which are incorporated herein by reference in their entireties.

FIELD OF THE INVENTION

The present invention relates to methods for the removal of organic nitrogen, organic and inorganic contaminants from an aqueous liquid. More particularly, the present invention is related to a process for the removal of organic and inorganic contaminants from wastewater and ground water.

BACKGROUND ART

Publicly own treatment works (POTW) generally cannot handle industrial wastewater, which contains high levels of contaminants that are toxic, inhibitory or recalcitrant to biological treatment (e.g. pesticides, biocides, coolants and dyestuff). Industrial waste treatment plant is used to treat the high strength and low flow industrial effluent to reduce the Chemical Oxygen Demand (COD) and the Biological Oxygen Demand (BOD) through process such as chemical oxidation prior to discharge to POTW or to watercourse.

Organic nitrogen in wastewater is usually broken up into ammonia and during the oxidation process ammonia is finally oxidised to nitrates. As a result, the presence of high nitrogen content of effluent discharge often resulted in also high nitrate nutrient content in treated water discharged. The biological process for nitrogen removal is slow and generally requires either a large area or large volume tank.

Nitrosonium ion forms unstable intermediates with aliphatic amines and amino compounds. This process can be used to remove organic nitrogen (such as in amines, amides and amino acids) from effluent as nitrogen gas prior to the oxidation process thereby lowering the nitrogen nutrient content of discharged water.

Reagents such as permanganate, chlorine gas, hypo-chloride, ozone, and ozone with ultraviolet light (UV), hydrogen peroxide and hydrogen peroxide with or without metallic ion catalysts, UV light or ozone have been used for chemical oxidation. Ozone has been used together with activated carbon in biological activated carbon (BAC) processes to oxidise complicated non-biodegradable organic contaminants to simpler molecules for biological treatment.

The activated carbon is normally used only as an absorbent for the organic contaminants. The activated carbon is used either after the oxidation process to remove any recalcitrant contaminants and oxidation by-products in a separate stage or to adsorb the organic contaminants through physical-chemical means from the fluid onto the solid carbon media before oxidising the contaminants.

The main disadvantage of ozone is the high cost and low efficiency of ozone generating equipment. UV activated process requires large reactor size to achieve sufficient contact resulting in high capital cost. The efficiency of UV treatment is very dependent on the turbidity of the water and any other hindrances of the transmission of UV light to the water. Hydrogen peroxide with dissolved iron salts as in Fenton's reagent requires low pH (2-3) for oxidation and neutralisation (5.5-9) before the water can be disposed. Large amount of bulky ferric hydroxide precipitate that has to be removed is also produced by the activation with metallic ions.

Accordingly there has been a need for a process of treating aqueous liquid which may overcome some if not all the above-cited problems. Such a process is being provided by the present invention.

The present invention consists of certain novel features and iii combinations of parts hereinafter fully described and illustrated in the accompanying description, and particularly pointed out in the appended claims, it being understood that various changes in the details may be made without departing from the scope of the invention, or sacrificing any advantage of the present invention.

SUMMARY OF THE INVENTION

Accordingly, the present invention provides a method for removing organic nitrogen from an aqueous liquid, said method includes the step of adding a nitrosonium ion generator into said aqueous liquid to remove nitrogen from organic based nitrogen contaminant such as amines, amides, urea and amino acids at a controlled temperature.

Also provided a method for removing organic and inorganic contaminants from an aqueous liquid, said method includes the step of adding a peroxide in the presence of a suitable catalyst at controlled pH to oxidise and remove other organic and inorganic contaminants wherein the catalyst is used as a particulate in a fixed bed reactor or moving bed reactor caused by the motion of fluid or gases, or by mechanical means through which the aqueous liquid to be treated comes in continuous contact in the presence of the peroxide.

DETAILED DESCRIPTION OF THE PREFERRED EMBODIMENTS

The present invention relates to methods for the removal of organic nitrogen, organic and inorganic contaminants from an aqueous liquid. More particularly, the present invention related to a process for the removal of organic and inorganic contaminants from wastewater and ground water. Hereinafter, this specification will describe the process according to the preferred embodiments of the present invention and by referring to the accompanying description. However, it is to be understood that limiting the description to the preferred embodiments of the invention is merely to facilitate discussion of the present invention and it is envisioned that those skilled in the art may devise various modifications and equivalents without departing from the scope of the appended claims.

Nitrogen in nitrogen containing organic contaminants, such as aliphatic amines, amides, amino acids and their salts and urea may be removed by reacting with nitrosonium ion generated in-situ through the addition of a nitrite in acidic media at room temperature or high, prior to the peroxide/carbon oxidation process. The removal of part or all the organic nitrogen will reduce the nitrogen content as either ammonia or nitrate nutrients in the final discharged water.

The contaminated water is oxidised with hydrogen peroxide in the presence of activated carbon, which enhances the rate of contaminant removal, by acting both as an accelerator for hydrogen peroxide oxidation and also as an absorbent for the some of the contaminants and the by-products.

The use of hydrogen peroxide solution simultaneously with activated carbon to treat water containing both organic and inorganic contaminants will simplify the process and lower the cost of the equipment required. When hydrogen peroxide is used together with activated carbon, the rate of oxidation reaction appears to be accelerated by the adsorption and concentration of contaminant molecules on the carbon surface as well as the activation and acceleration of the oxidation process at the carbon surface and in the aqueous medium. Hydrogen peroxide oxidation is effective on a diverse group of contaminants while it generates minimal secondary wastes, which are harmless (e.g. water and carbon dioxide) or biodegradable (e.g. carboxylic acids).

An overall reduction in the COD of coloured dye effluent or used machining coolant of more than 98% is obtained by using hydrogen peroxide and activated carbon oxidation process.

The oxidation of amines by hydrogen peroxide generates ammonia or finally nitrates in excess peroxide. The reaction rate of aliphatic amines by hydrogen peroxide is generally slow.

These two disadvantages are overcome by reacting the amines with nitrosonium ions, which is generated in-situ by metallic nitrite (e.g. sodium nitrite) in an acidic medium. Slight warming of the solution accelerates the decomposition of the unstable intermediate to gaseous nitrogen and alcohol, ketone or alkene. The by-products or any excess nitrite can readily be oxidised by the hydrogen peroxide and granulated activated carbon ($H_2O_2$/GAC) process so the nitrogen removal process is preferred to be before another oxidation process. In order to minimise the nitrogen content in the discharge water, only up to a maximum of the theoretical amount of nitrite is added. Nitrogen from amines, amides, amino acids and their salts and urea can also be removed from industrial and agricultural wastewater by this method.

The rate of colour and contaminants removal of dye contaminants from coloured dye effluent with hydrogen peroxide/granulated activated carbon ($H_2O_2$/GAC) process is 50 times faster than with granulated activated carbon alone and more than 200 times faster than with unactivated hydrogen peroxide alone. A similar rate of contaminant removal is also observed with the aqueous solution from used machining coolant.

When compared with Fe catalysed hydrogen peroxide oxidation process at pH 3, the $H_2O_2$/GAC process takes less than half the time to remove the contaminants to the same extent as compared to the Fenton's reagent. Similar overall rate of contaminants removal (by comparing final COD measurements) as hydrogen peroxide activated carbon process is obtained when Fe(II), Fe(III), Cu(II) or Mn(II) ions together with activated carbon to accelerate the peroxide oxidation.

This indicates that there is a synergistic effect when hydrogen peroxide is used together with activated carbon in the removal of organic contaminants from wastewater. The $H_2O_2$/GAC process also has the advantage of operating at a milder pH and does not produce any additional metallic hydroxide slurry.

The activated carbon activator is used in various configurations, as a suspension in a batch reactor whereby it is simply stirred by the gas generated within the reactor or by a mechanical stirrer, or as particulate in a fixed or moving bed reactor through which the fluid either flow upwards or downwards for a continuous process. For a continuous process, it is also being kept in motion or fluidised through the motion of the fluid or by pressurised gas fed from the bottom of the reactor or through the motion of the bulk fluid by a mechanical stirrer.

The greatest advantages of the process are its simplicity, the ability to treat high concentration of contaminant and the rapid treatment time. The simplicity and efficiency of the process allows a simpler and more compact plant to be built. Since it is a non-thermal, ambient pressure and aqueous process for aqueous effluent, it has a relatively lower operating cost than thermal process. It uses readily available and inexpensive reagents. The used GAC can be regenerated and recycled. Hydrogen peroxide oxidation is effective for a diverse group of contaminants and it produces minimal secondary waste.

Example A

Used machining coolant at 5% oil concentration, pH 9.3 and COD value of 35,000 mg $O_2$/l is chemically split to separate the oil from the aqueous portion. Sodium nitrite (5 gm/l) is added to the aqueous portion at pH 3, COD value of 15,000 mg $O_2$/l. The reaction temperature is 28° C. or higher. Amine nitrogen is first removed from the aqueous portion. After 1-2 hour, the pH of the solution is adjusted to pH 6.5 to 9.0 and treated with 50% $H_2O_2$ (65 gm/l) together with granular activated carbon (−12+30 mesh, I2 No. 1000 mg/g). After about 4-12 hours, the COD drops to about 180 mg $O_2$/l and clear decolourised water is obtained. There is a reduction of 98.8% in the COD value during the oxidation process alone in the aqueous phase.

Example B

A coffee coloured dye effluent containing 410 mg/l "Dygon" No. 7 dye, 10 gm/l sodium chloride with a COD of 1100 mg $O_2$/l at pH 6.5 is treated with 50% $H_2O_2$ (4.5 gm/l) together with granular activated carbon (−12+30 mesh, I2 No. 1000 mg/g) after adjusting the pH to 8.0. After 1-2 hours, the reduction in colour is >99% and the final COD value is <10 mg $O_2$/l, giving a COD reduction of >99%. The final pH of the clear, decolourised solution is 7.5.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

The invention claimed is:

1. A method for removing organic nitrogen from an aqueous liquid, said method comprising:
   adding a nitrosonium ion generator into said aqueous liquid to remove nitrogen from organic-based nitrogen contaminants at a controlled temperature; and
   oxidizing the aqueous liquid,
   wherein oxidizing the aqueous liquid comprises adding a peroxide in the presence of an activated carbon catalyst.

2. A method for removing organic and inorganic contaminants from an aqueous liquid, said method comprising:
   adding a peroxide solution in the presence of an activated carbon catalyst at a controlled pH to oxidise and remove organic and inorganic contaminants,
   wherein the catalyst is used as a particulate in a fixed bed reactor or moving bed reactor caused by the motion of fluid or gases, or by mechanical means through which the aqueous liquid to be treated comes in continuous contact with the catalyst in the presence of the peroxide solution.

3. A method as claimed in claim 2, wherein the peroxide solution is hydrogen peroxide solution.

4. A method as claimed in claim 2, wherein the controlled pH is selected from a pH range of 2 to 12, and the method is performed at atmospheric pressure.

5. A method as claimed in claim 3, wherein the method is performed at a controlled temperature, the controlled temperature selected from a range of 0° C. to less than 50° C.

6. A method as claimed in claim 5, wherein the controlled temperature is between 0° C. and 40° C.

* * * * *